US011958057B2

(12) United States Patent
Ribeiro et al.

(10) Patent No.: US 11,958,057 B2
(45) Date of Patent: Apr. 16, 2024

(54) MAGNETIC MATRICES AND METHODS OF USING THE SAME

(71) Applicants: Cláudio Henrique Teixeira Ribeiro, Ellicott City, MD (US); José Pancrácio Ribeiro, Nova Lima (BR)

(72) Inventors: Cláudio Henrique Teixeira Ribeiro, Ellicott City, MD (US); José Pancrácio Ribeiro, Nova Lima (BR)

( * ) Notice: Subject to any disclaimer, the term of this patent is extended or adjusted under 35 U.S.C. 154(b) by 0 days.

(21) Appl. No.: 18/056,395

(22) Filed: Nov. 17, 2022

(65) Prior Publication Data

US 2023/0077005 A1 Mar. 9, 2023

Related U.S. Application Data

(63) Continuation of application No. 17/067,066, filed on Oct. 9, 2020, now Pat. No. 11,529,636.

(51) Int. Cl.
*B03C 1/034* (2006.01)

(52) U.S. Cl.
CPC .......... *B03C 1/034* (2013.01); *B03C 2201/22* (2013.01)

(58) Field of Classification Search
CPC ...... B03C 1/034; B03C 1/035; B03C 2201/22
See application file for complete search history.

(56) References Cited

U.S. PATENT DOCUMENTS 3,830,367 A 8/1974 Stone
3,912,634 A 10/1975 Howell
4,046,680 A * 9/1977 Fritz .......................... B03C 1/03 209/225
4,737,294 A 4/1988 Kukuck
4,874,508 A 10/1989 Fritz
5,514,340 A * 5/1996 Lansdorp ......... G01N 33/56972 209/636
6,241,894 B1 6/2001 Briggs et al.
7,190,580 B2 3/2007 Bezama et al.
(Continued)

FOREIGN PATENT DOCUMENTS

BR 20 2012 016519 7/2013
DE 37 44 167 A1 7/1989
(Continued)

OTHER PUBLICATIONS

International Search Report dated Feb. 15, 2022 for International Patent Application No. PCT/IB2021/059128 (4 pages).
(Continued)

*Primary Examiner* — Patrick H Mackey
(74) *Attorney, Agent, or Firm* — Smith, Gambrell & Russell, LLP

(57) ABSTRACT

A magnetic matrix for magnetic separation of particles in a material feed includes a plurality of grooved plates having first and second sides that both have an alternating series of teeth and grooves therealong, each grooved plate having an offset alignment in which teeth and grooves on a first side of a plate are laterally offset from teeth and grooves on a second side of the same plate. Also provided are methods of using magnetic matrices to separate magnetic ores, with the methods characterized by a negative correlation in which magnetic matrices constructed with grooved plates having larger pitches are used for the separation of ultrafine particles.

27 Claims, 11 Drawing Sheets

(56) References Cited

U.S. PATENT DOCUMENTS

| | | | | |
|---|---|---|---|---|
| 7,190,589 | B2 | 3/2007 | Caines et al. | |
| 9,884,326 | B2 * | 2/2018 | Oki | B03C 1/02 |
| 10,748,692 | B2 * | 8/2020 | Høyer | H01F 7/20 |
| 10,748,697 | B2 | 8/2020 | Madsen et al. | |
| 11,084,045 | B2 | 8/2021 | Ribeiro | |
| 11,529,636 | B2 * | 12/2022 | Ribeiro | B03C 1/0332 |
| 2020/0030817 | A1 | 1/2020 | Ribeiro | |

FOREIGN PATENT DOCUMENTS

| | | | |
|---|---|---|---|
| GB | 1 559 338 | | 1/1980 |
| GB | 1 576 071 | | 10/1980 |
| SU | 1593701 | A1 | 9/1990 |
| WO | 2017/100889 | A1 | 6/2017 |

OTHER PUBLICATIONS

Written Opinion of the International Searching Authority dated Feb. 15, 2022 for International Patent Application No. PCT/IB2021/059128 (8 pages).

Lafosse, J., et al., Industrie Minérale: Les Techniques, "Calcul des Forces Magnétiques Dans les Entrefers d'un Séparateur Magnétique Haute Intensité du Type Corps Induits," 1983. pp. 97-115.

Svoboda, Jan, Magnetic Techniques for the Treatment of Materials, Springer Science & Business Media, Inc. 2007, Google Play Books, DOI: 10.1007/978-1-4020-2107-7, Ch. 2: Review of Magnetic Separation Equipment and Techniques, pp. 77-172.

Svoboda, Jan, Magnetic Techniques for the Treatment of Materials, Springer Science & Business Media, Inc. 2007, Google Play Books, DOI: 10.1007/978-1-4020-2107-7, pp. 106-112.

Svoboda, Jan, Magnetic Techniques for the Treatment of Materials, Springer Science & Business Media, Inc. 2007, Google Play Books, DOI: 10.1007/978-1-4020-2107-7, Ch. 5: Practical Aspects of Magnetic Methods for Materials Treatment, pp. 329-477.

Svoboda, Jan, Magnetic Techniques for the Treatment of Materials, Springer Science & Business Media, Inc. 2007, Google Play Books, DOI: 10.1007/978-1-4020-2107-7, pp. 385-392.

Wasmuth et al., Recent Developments in Magnetic Separation of Feebly Magnetic Minerals, Minerals Engineering Magazine U.K., vol. 4, Nos. 7-11, pp. 825-837, (1991).

* cited by examiner

-- Prior Art --

-- Prior Art --

-- Prior Art --

(18.a) (18.b)

MAGNETIC MATRICES AND METHODS OF USING THE SAME

FIELD OF THE INVENTION

The present invention relates to magnetic matrices for use in magnetic separators for the separation of magnetic and non-magnetic particles in material feeds. In particular, the present invention concerns magnetic matrices formed of a plurality of grooved plates with laterally displaced teeth, and methods of making and using the same in magnetic separation processes.

BACKGROUND OF THE INVENTION

In a typical magnetic separation process, a raw material containing both magnetic and non-magnetic components is caused to flow through a magnetic separator having one or more magnetic matrices for separating the magnetic and non-magnetic components. The material feed may be the raw material alone (e.g., a dry material feed) or a slurry formed from mixing the raw material with a fluid (e.g., a wet material feed).

Magnetic separators used in such processes have at their core a magnetic matrix, of which there are several different types for use depending on the type of raw material that is to be separated and the type of material feed (e.g., dry or wet). One conventional type of magnetic matrix is the grooved plate matrix that is formed of a plurality of grooved plates aligned in parallel to form a series of gaps therebetween for the passage of a material feed therethrough. Examples of grooved plate matrices are described by Stone (U.S. Pat. No. 3,830,367) and Pereira de Moraes (BR 20 2012 016519). FIGS. 1-3 show one example of a conventional magnetic matrix 1 formed from a plurality of grooved plates 2 aligned in parallel with one another, and separated from one another by spacing rods 3 to form gaps 4 therebetween. The plurality of plates includes internal plates 2 that each have a number of teeth 5 and grooves 6 along both opposite first and second sides thereof, and external plates 2' that each have a number of teeth 5 and grooves 6 along only an inner side thereof.

Few improvements have been made to grooved plate matrices over the years. Previously, grooved plate matrices were made with only a standard 3.175 mm pitch (8 teeth/inch). In 1991, KHD, Humboldt Wedag AG, a worldwide industry leader in the development of magnetic separators at that time, introduced two new magnetic matrices that used grooved plates having a 6.350 mm pitch (4 teeth/inch) and 2.116 mm pitch (12 teeth/inch). See Wasmuth et al., Recent Developments in Magnetic Separation of Feebly Magnetic Minerals, Minerals Engineering Magazine U.K., Vol. 4, Nos 7-11, pp 825-837. Upon introducing these new magnetic matrices, KHD taught that magnetic matrices should use grooved plates with a pitch that is selected based on the size of the particles that are to be separated thereby, with a larger pitch (i.e., larger teeth) used for larger, course particles and a smaller pitch (i.e., smaller teeth) used for smaller, fine particles. Specifically, KHD taught that a 6.350 mm pitch (4 teeth/inch) for course particles with diameters from 1.5 mm to 6 mm; a 3.175 mm pitch (8 teeth/inch) for fine particles with diameters from 50 μm to 1.5 mm; and a 2.116 mm pitch (12 teeth/inch) for ultrafine particles with diameters less than 50 μm. Wasmuth, at 834. As a leader in the industry at that time, these teachings of KHD were accepted and adopted without question among experts.

There has not been any significant developments made relative to grooved plate magnetic matrices in recent years, and it is now the accepted wisdom in the art that grooved plate matrices should use grooved plates having a pitch with a positive correlation to particle size—e.g., larger pitches (larger tooth sizes) for separating larger, course particles; and smaller pitches (smaller tooth sizes) for separating smaller, fine particles.

Despite these long-standing practices in the art, there remains a need for improvements to magnetic matrices for yet further advancing the state of the art, and improving the output and efficiencies of magnetic separators generally.

SUMMARY OF THE INVENTION

Magnetic matrices according to the present invention may be used in magnetic separation of ore particles in a material feed, and these magnetic matrices may comprise a plurality of plates, including inner plates and outer plates, with at least the inner plates being formed as grooved plates having first and second sides that both have an alternating series of teeth and grooves therealong. Each inner plate may have an offset alignment in which teeth and grooves on a first side of a plate are laterally offset from teeth and grooves on a second side of the same plate, such that peaks of the teeth on the first side of the plate reside on a common axis as valleys of the grooves on the second side of the plate, and such that peaks of the teeth on the second side of the plate reside on a common axis as valleys of the grooves on the first side of the plate.

The magnetic matrices may be constructed with inner plates that may have an offset alignment in which each tooth on the first and second sides overlaps with two separate teeth on an opposite side of the same plate. The inner plates may have a constant body width along substantially the entire length of the plate, the body width being measured between longitudinally aligned portions of the first and second sides of the plate having the sequence of teeth and grooves. The inner plates may have a maximum profile width that is greater than the body width, the maximum profile width being measured between peaks of offset teeth on opposite sides of the plate. The inner plates may comprise a plate root having a root width that is less than the body width, the root width being measured between valleys of offset grooves on opposite sides of the plate.

The magnetic matrices may be constructed with a plurality if inner plates that are each aligned with plates adjacent thereto such that peaks of each tooth on each plate are made to align and reside on a common axis line with peaks of opposing teeth on an immediately adjacent plate. The inner plates may be aligned with plates adjacent thereto such that valleys of each groove on each plate are made to align and reside on a common axis line with valleys of opposing grooves on an immediately adjacent plate. The inner plates may be aligned with one another such that there is a series of axis lines that are each characterized by a repeating sequence of opposing "peak-peak" alignments and opposing "valley-valley" alignments along each axis line, an opposing "peak-peak" alignment being one in which peaks of opposing teeth on immediately adjacent plates reside on a common axis line, and an opposing "valley-valley" alignment being one in which valleys of opposing grooves on immediately adjacent plates reside on a common axis line.

The magnetic matrices may further comprise a south magnetic pole and a north magnetic pole, the south and north magnetic poles being positioned at opposite sides of the plurality of plates for generating one or more magnetic fields within the plurality of plates. The magnetic matrices may also be constructed with a pitch to gap ratio, representing a ratio between a pitch of the grooved plates and a gap between peaks of opposing teeth on adjacent grooved plates, that is 3:1 or greater; and which may be in a range of 3:1 to 20:1.

Methods of using the magnetic matrices may comprise passing a material feed through a magnetic matrix; wherein the magnetic matrix comprises a plurality of plates, comprising inner plates and outer plates, with at least the inner plates being formed as grooved plates having first and second sides that both have an alternating series of teeth and grooves therealong, the inner plates having a pitch of approximately 6.35 mm pitch (4 teeth/inch), and the material feed comprises magnetic and non-magnetic ultrafine particles components. These methods may further comprise separating the ultrafine particles comprising particles having an average diameter of about 50 μm; separating components in a dry material feed or a wet material feed.

Methods of magnetic separation may be performed with magnetic matrices in which each inner plate has an offset alignment in which teeth and grooves on a first side of a plate are laterally offset from teeth and grooves on a second side of the same plate; and the offset alignment may be such that peaks of the teeth on the first side of the plate reside on a common axis as valleys of the grooves on the second side of the plate, and such that peaks of the teeth on the second side of the plate reside on a common axis as valleys of the grooves on the first side of the plate.

Both the foregoing general description and the following detailed description are exemplary and explanatory only and are intended to provide further explanation of the invention as claimed. The accompanying drawings are included to provide a further understanding of the invention; are incorporated in and constitute part of this specification; illustrate embodiments of the invention; and, together with the description, serve to explain the principles of the invention.

BRIEF DESCRIPTION OF THE DRAWINGS

Further features and advantages of the invention can be ascertained from the following detailed description that is provided in connection with the drawings described below.

DETAILED DESCRIPTION OF THE INVENTION

Figure 1:
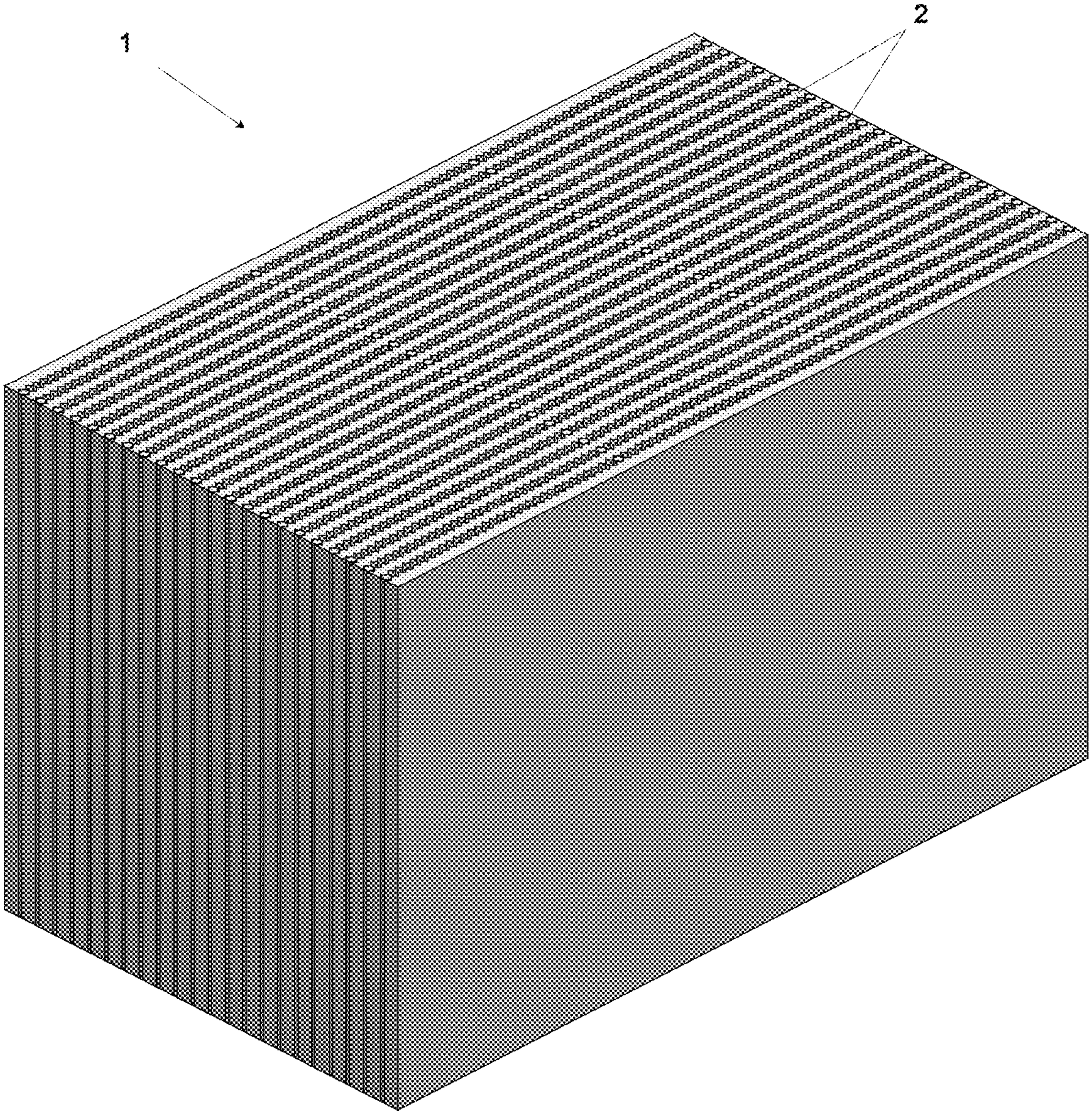
FIG. 1 shows a conventional magnetic matrix.

The following disclosure discusses the present invention with reference to the examples shown in the accompanying drawings, though does not limit the invention to those examples.

The use of any and all examples, or exemplary language (e.g., "such as") provided herein is intended merely to better illuminate the invention and does not pose a limitation on the scope of the invention unless otherwise claimed. No language in the specification should be construed as indicating any non-claimed element as essential or otherwise critical to the practice of the invention, unless made otherwise clear in context.

As used herein, the singular forms "a," "an," and "the" include plural referents unless the context clearly dictates otherwise. Unless indicated otherwise by context, the term "or" is to be understood as an inclusive "or." Terms such as "first", "second", "third", etc. when used to describe multiple devices or elements, are so used only to convey the relative actions, positioning and/or functions of the separate devices, and do not necessitate either a specific order for such devices or elements, or any specific quantity or ranking of such devices or elements.

The word "substantially", as used herein with respect to any property or circumstance, refers to a degree of deviation that is sufficiently small so as to not appreciably detract from the identified property or circumstance. The exact degree of deviation allowable in a given circumstance will depend on the specific context, as would be understood by one having ordinary skill in the art.

Use of the terms "about" or "approximately" are intended to describe values above and/or below a stated value or range, as would be understood by one having ordinary skill in the art in the respective context. In some instances, this may encompass values in a range of approx. +/−10%; in other instances there may be encompassed values in a range of approx. +/−5%; in yet other instances values in a range of approx. +/−2% may be encompassed; and in yet further instances, this may encompass values in a range of approx. +/−1%.

It will be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless indicated herein or otherwise clearly contradicted by context.

Recitations of a value range herein, unless indicated otherwise, serves as a shorthand for referring individually to each separate value falling within the stated range, including the endpoints of the range, each separate value within the range, and all intermediate ranges subsumed by the overall range, with each incorporated into the specification as if individually recited herein.

Unless indicated otherwise, or clearly contradicted by context, methods described herein can be performed with the individual steps executed in any suitable order, including: the precise order disclosed, without any intermediate steps or with one or more further steps interposed between the disclosed steps; with the disclosed steps performed in an order other than the exact order disclosed; with one or more steps performed simultaneously; and with one or more disclosed steps omitted.

As used herein, "small teeth" will be understood as referring to teeth that have a pitch of about 2.116 mm or less (i.e., about 12 teeth/inch, or more); teeth having a pitch from about 2.116 mm (i.e., about 12 teeth/inch) to about 3.175 mm (i.e., about 8 teeth/inch) may be referred to herein as "standard teeth"; "large teeth" will be understood as referring to teeth that have a pitch of about 3.175 mm (i.e., less than 8 teeth/inch) or larger.

As used herein, "ultrafine particles" will be understood as referring to particles having a diameter of about 50 μm or less (a mesh of about 270 or higher); "fine particles" will be understood as referring to particles having a diameter of about 50 μm (about 270 mesh) to about 6 mm (about ¼ inch mesh); and "course particles" will be understood as referring to particles having a diameter of about 6 mm or more (a mesh of about ¼ inch or larger).

Conventionally, it has been accepted in the art that the pitch (tooth size) of a grooved plate magnetic matrix should have a positive correlation with the particle size of components that are to be separated thereby—with larger pitches (larger tooth sizes) for separating larger, course particles; and smaller pitches (smaller tooth sizes) for separating smaller, fine particles. However, it has recently been found that this practice is ill-suited for the separation of ultrafine particles.

Particles in a material feed flow that is travelling through a magnetic matrix are subjected to a number of competing forces, including, for example, magnetic fields; gravity, inertia, centrifugal forces and hydrodynamic drag. The individual influence of these competing forces varies depending on particle size. According to the Stokes equation, gravity will be the dominant force on particles having an average diameter greater than 500 μm (0.5 mm); whereas hydrodynamic drag will be the dominant force for smaller, ultrafine particles having an average diameter around 50 μm (0.05 mm) or less. Thus, when separating ultrafine particles, better results in attracting and holding such particles are expected with use of strong magnetic field intensities and high magnetic gradients to overcome the hydrodynamic drag forces.

Figure 4:
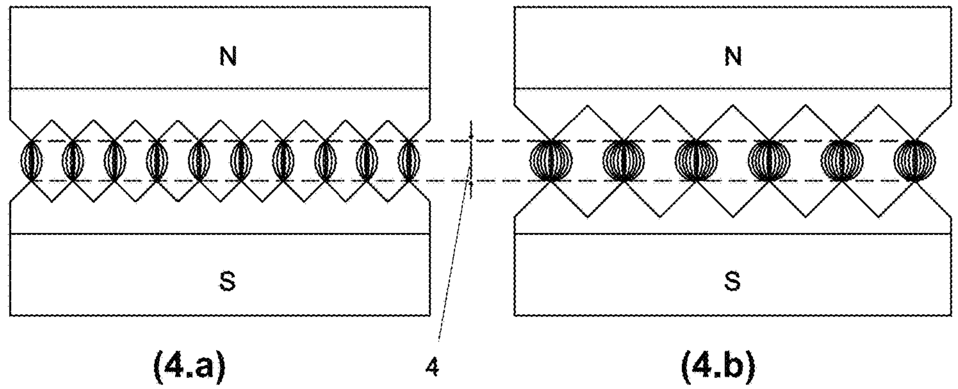
FIG. 4 shows comparative magnetic fields generated by two different magnetic grooved plates, including: (a) a grooved plate having a lower pitch and smaller teeth, generating a magnetic field with dispersed magnetic lines of lesser individual intensity; (b) a grooved plate having a higher pitch and larger teeth, generating a magnetic field with concentrated magnetic lines of greater individual intensity.

FIGS. 4a-4b present schematic illustrations of two separate magnetic grooved plate arrangements, and the magnetic fields generated thereby. Both arrangements use magnetic poles of the same magnetic field strength and are configured with the opposing teeth separated by an identical gap therebetween. In the first arrangement (FIG. 4a), a grooved plate having a pitch of about 3.175 mm, with a greater number of teeth per unit length, is seen to yield a magnetic field that is divided into a greater number of dispersed magnetic lines of relatively lesser magnetic intensity. On the other hand, in the second arrangement (FIG. 4b), a grooved plate having a pitch of about 6.35 mm, with a lesser number of teeth per unit length, is seen to yield a magnetic field that is concentrated into a lesser number of magnetic lines of relatively greater magnetic intensity. While not being bound by theory, it is believed that concentrating the magnetic field through a fewer number of larger teeth results in the second arrangement (FIG. 4b) providing fewer tips concentrating the magnetic lines, resulting in overall stronger magnetic field intensities on these fewer tips, thereby producing more intense magnetic forces.

The present invention is inclusive of magnetic matrices that adopt an inverse correlation for the magnetic separation of ultrafine particles by using grooved plates with a larger pitch (larger tooth size). The present invention is also inclusive of magnetic matrices that employ a larger pitch without increasing the overall size or compromising the structural integrity of the magnetic matrix. These goals are achieved, in some examples, by constructing a magnetic matrix with grooved plates in which teeth on opposite sides of individual plates are laterally offset relative to one another, providing a magnetic matrix with a larger pitch (larger teeth) without changing the dimensions of the magnetic matrix as a whole.

Figure 2:
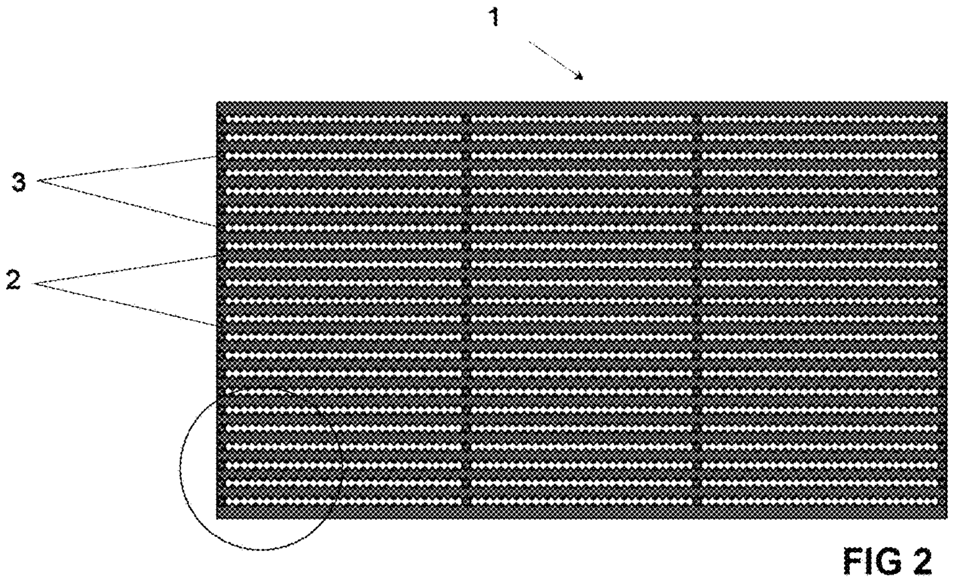
FIG. 2 shows a top plan view of the magnetic matrix of FIG. 1.
Figure 3:
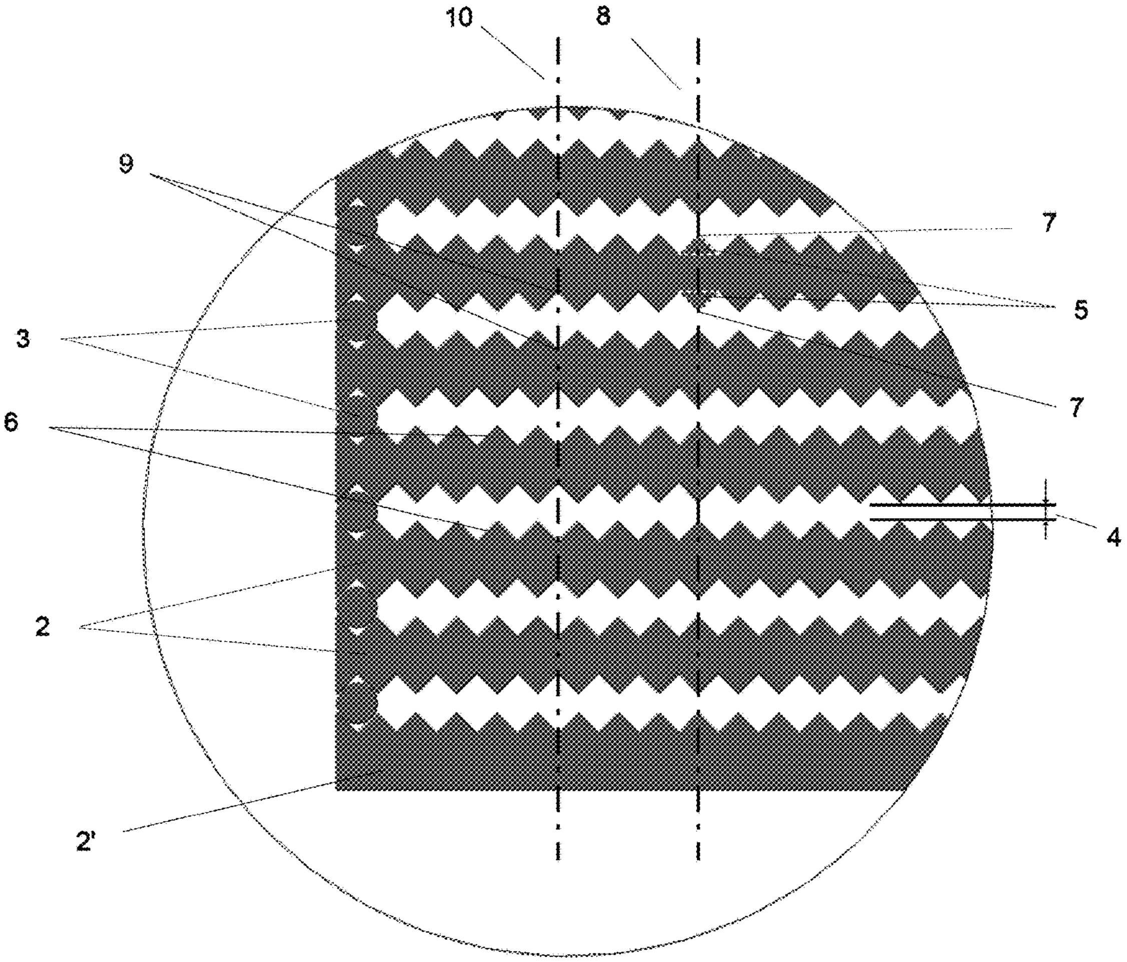
FIG. 3 shows a close-up of grooved plates in the magnetic matrix of FIG. 1.

FIGS. 1-3 show one example of a conventional magnetic matrix 1 formed from a plurality of grooved plates 2 aligned in parallel with one another, and spaced from one another by spacing rods 03 to form gaps 4 therebetween. The plurality of plates includes internal plates 2 that each have a number of teeth 5 and grooves 6 along both opposite first and second sides thereof, and external plates 2' that each have a number of teeth 5 and grooves 6 along only an inner side thereof.

The teeth 5 on each plate 2 are uniformly aligned throughout the conventional matrix 1 in a mirrored alignment. That is, on each individual plate 2, each tooth 5 on a first side is made to align with a tooth 5 on a second side of that same plate 2 such that the peaks 7 of the two aligned teeth 3 reside on a common axis line 8. Likewise, on each individual plate 2, each groove 6 on the first side is made to align with a groove 6 on the second side of that same plate 2 such that the valleys 9 of the two aligned grooves 6 reside on a common axis line 10.

In addition, each plate 2 is aligned with the plates 2 adjacent thereto such that the peaks 7 of each tooth 5 on each plate 2 are made to align and reside on a common axis line 8 with the peaks 7 of opposing teeth 5 on an immediately adjacent plate 2. This alignment of the plates 2 likewise results in the valleys 9 of each groove 6 on each plate 2 aligning and residing on a common axis line 10 with the valleys 9 of opposing groves 6 on an immediately adjacent plate 2. As a result, the conventional magnetic matrix 1 is characterized by a series of alternating tooth axis lines 8 and groove axis lines 10 in which each tooth axis line 8 has only tooth peaks 7 residing therealong and each groove axis line 10 has only valleys 9 residing therealong.

Figure 5:
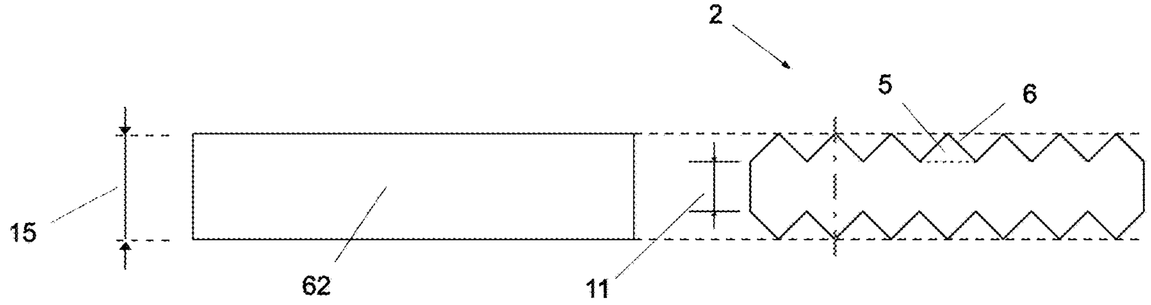
FIG. 5 shows the manufacture of a conventional mirror aligned grooved plate from a standard steel plate, as used in the magnetic matrix 1.
Figure 6:
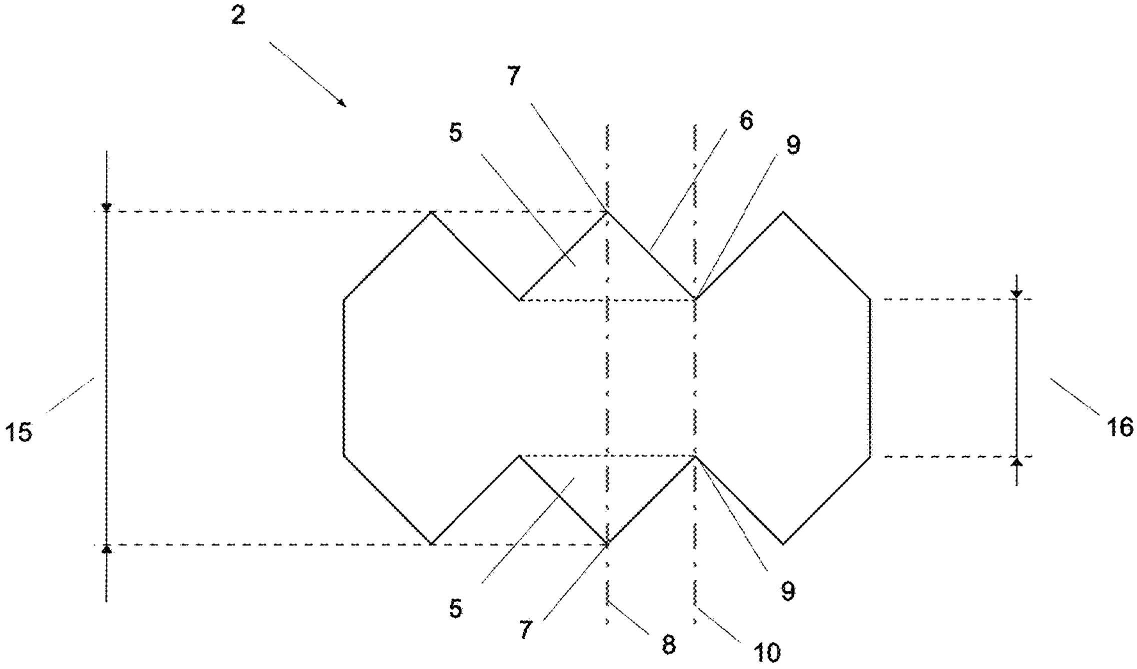
FIG. 6 shows the dimensions of the conventional grooved plate in FIG. 5.

The mirror alignment used in the conventional plates 2 results in these plates being made with a variable width. As illustrated in FIG. 5, production of such a conventional plate 2 begins with a bulk material 62, such as a standard steel plate, into which a series of furrows are formed to create an alternating sequence of teeth 5 and grooves 6, with a root 11 corresponding to a continuous and uninterrupted central section of the plate 2. As shown in FIG. 6, the conventional plate 2 has a maximum width 15, as measured between peaks 7 of aligned teeth 5 on opposite first and second sides thereof; and a minimum width 16, corresponding to a width of the plate root 11, as measured between valleys 9 of aligned grooves 6 on the opposite first and second sides. As one non-limiting example, a conventional grooved plate 2 may be made with a pitch of 3.175 mm (8 teeth/inch), a maximum width of 6.00 mm, and a root width of 2.83 mm.

While the conventional mirror aligned grooved plate 2 in FIGS. 5-6 may be suitable for use in magnetic matrices adapted for separating fine particles, they are not preferred for use in separating ultrafine particles. This is due to the fact that these conventional plates cannot generate a sufficiently intense magnetic field to efficiently capture and retain ultra-fine particles. It may be possible to generate stronger magnetic intensities with these conventional plates by moving the plates closer to one another, such that there is a smaller gap between adjacent plates. However, these conventional plates cannot, in practical terms, be adjusted for gaps smaller than 1.5 mm. This is because, in a magnetic matrix constructed of conventional mirror aligned plates 2, gaps smaller than 1.5 mm will result in clogging of the magnetic matrix due to a minimal tolerance between particle size and pass-through area of the gap, which will have a smaller groove clearance 14, as seen in FIG. 18*a*, and a feed rate of the feed material through the magnetic separator would have to be greatly decreased to avoid excessive clogging. Thus, the conventional grooved plates are considered inadequate for use in separating ultrafine particles in accord with the inverse correlation of the present invention, with preference instead given to grooved plates with larger pitches and larger teeth.

Figure 7:
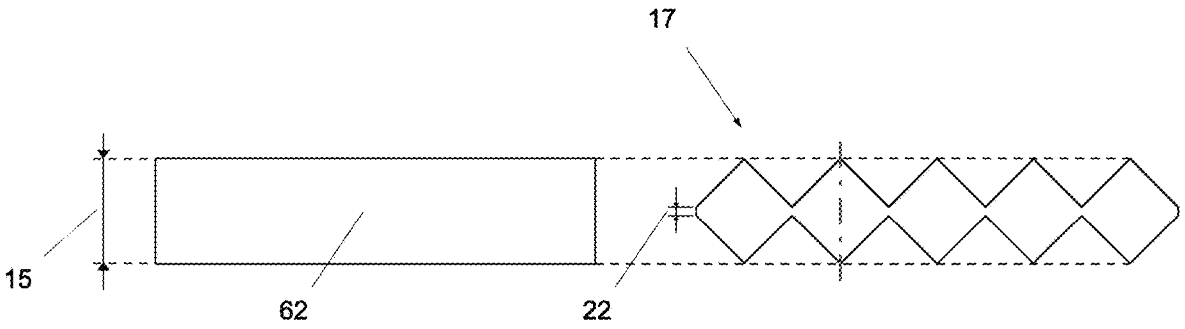
FIG. 7 shows the manufacture of a first example of a mirror aligned grooved plate with a larger pitch and larger teeth from a standard steel plate.
Figure 8:
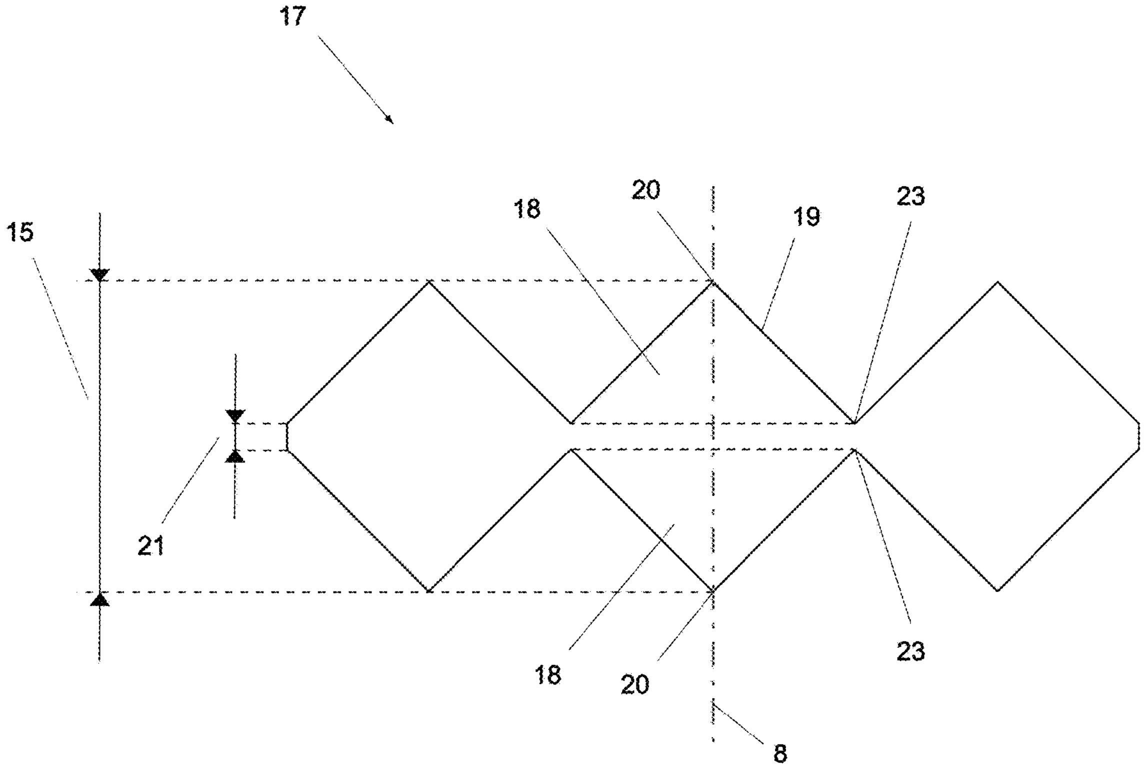
FIG. 8 shows the dimensions of the grooved plate in FIG. 7.

FIG. 7 shows the production of a first example of a mirror aligned plate 17 with a relatively larger pitch and relatively larger teeth in accord with the inverse correlation of the present invention. In this example, the grooved plate 17 is formed from the same bulk material 62 (standard steel plate) as conventional plate 2, with a series of furrows formed therein to create an alternating sequence of teeth 18 and grooves 19. As shown in FIG. 8, the plate 17 has a maximum width 15, as measured between peaks 20 of aligned teeth 18 on opposite first and second sides thereof; and a minimum width 21, corresponding to a width of the plate root 22, as measured between valleys 23 of aligned grooves 19 on the opposite first and second sides. As one non-limiting example, a grooved plate 17 may be made with a pitch of 5.50 mm (4.62 teeth/inch), a maximum width of 6.00 mm, and a root width of 0.50 mm.

Figure 9:
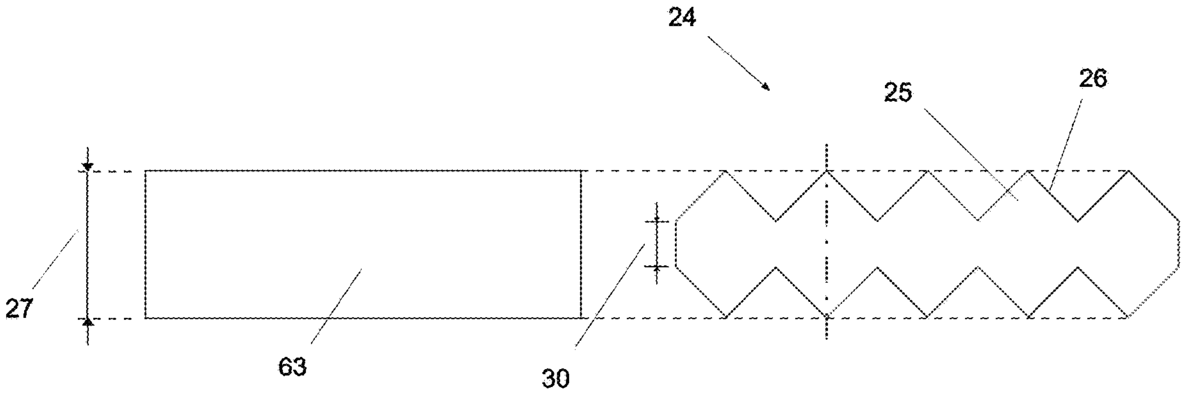
FIG. 9 shows the manufacture of a second example of a mirror aligned grooved plate with a larger pitch and larger teeth from a thicker steel plate.
Figure 10:
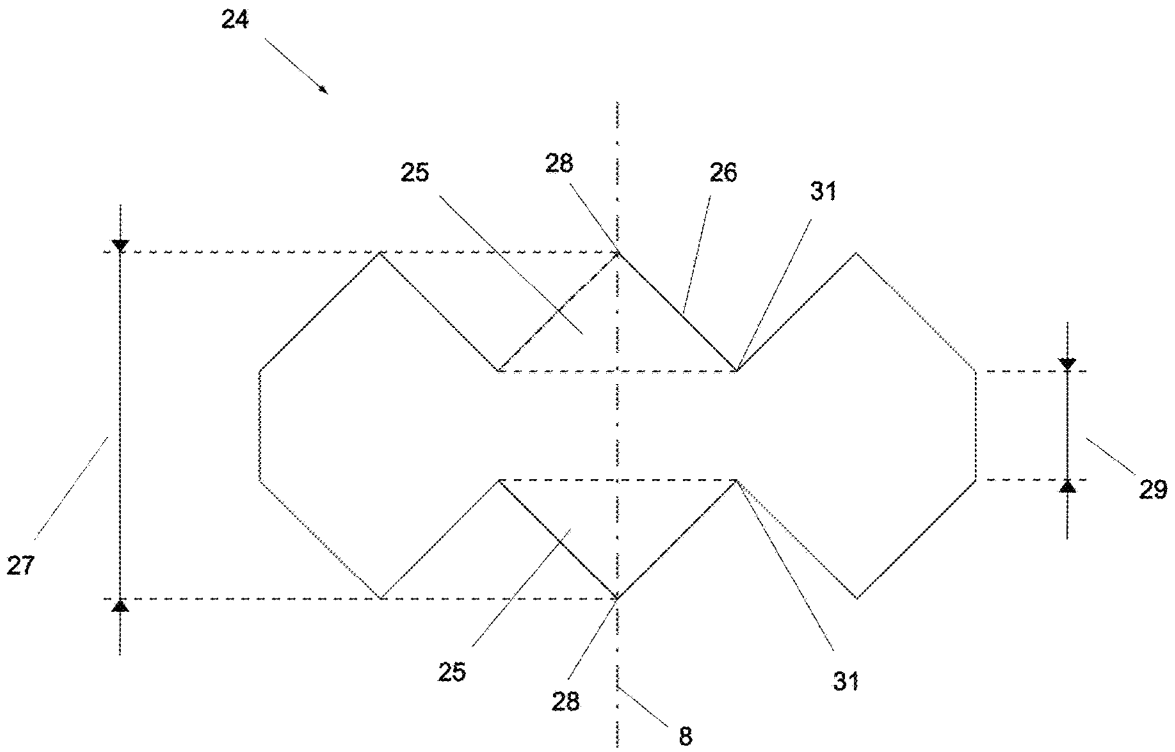
FIG. 10 shows the dimensions of the grooved plate in FIG. 9.

FIG. 9 shows the production of a second example of a mirror aligned plate 24, again with a relatively larger pitch and relatively larger teeth. In this example, the grooved plate 24 is formed from a larger bulk material 63 (a 30% thicker steel plate) as that used for producing a conventional plate 2, with a series of furrows formed therein to create an alternating sequence of teeth 25 and grooves 26. As shown in FIG. 10, the plate 24 has a maximum width 27, as measured between peaks 28 of aligned teeth 25 on opposite first and second sides thereof; and a minimum width 29, corresponding to a width of the plate root 30 as measured between valleys 31 of aligned grooves 26 on the opposite first and second sides. As one non-limiting example, a grooved plate 24 may be made with a pitch of 5.50 mm (4.62 teeth/inch), a maximum width of 8.00 mm, and a root width of 2.50 mm.

Figure 11:
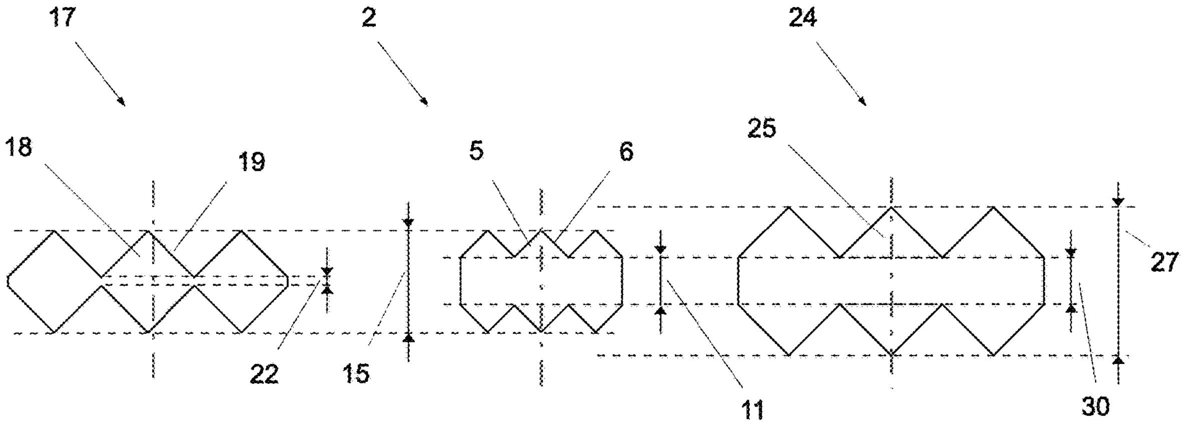
FIG. 11 shows a side-by-side dimensional comparison of the mirror aligned grooved plates in FIGS. 8 and 10 to the conventional grooved plate in FIG. 6.

A side-by-side comparison of the mirror aligned grooved plates 17/24 to the conventional grooved plate 2 is provided in FIG. 11, where there can be better seen the relative dimensions of the several grooved plates.

As can be seen, the plate 17 presents certain advantages in that it can be made from the same stock material as the conventional plate 2, and with a common maximum width 15 as the conventional plate 2, such that manufacture of the grooved plate 17 is expected to incur a common material cost as that for the conventional plate 2, and such that the grooved plate 17 may be directly substituted for the conventional plate 2. However, the grooved plate 17 also presents an undesirable drawback in that the formation of the larger pitch with larger teeth 18 is achieved by forming deeper furrows in the stock material, thereby resulting in deeper grooves 19 and a thinner root 22 in the plate 17 as compared to the grooves 6 and root 11 in the conventional plate 2. The relatively thinner root in the plate 17 may present a risk that the plate 17 could be subject to increased mechanical failures as compared to the conventional plate 2, both in manufacturing and operation.

The plate 24 presents an advantage in that it can be made with a root 30 having the same width as the root 11 of the conventional plate 2, such that the plate 24 is expected to have the same structural integrity as the conventional plate 2. However, the grooved plate 24 presents drawbacks in that production of the plate 24 requires use of a stock material of greater width, and thus a greater material cost, with the further result that the plate 24 has a larger maximum width 27 than the maximum width 15 of the conventional plate 2, thereby preventing direct substitution of a plate 24 for a conventional plate 2.

Figure 12:
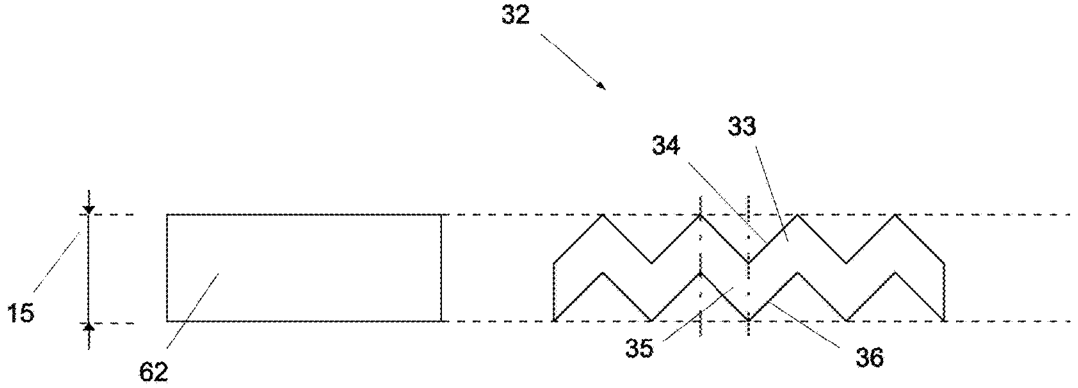
FIG. 12 shows the manufacture of an example of an offset aligned grooved plate with a larger pitch and larger teeth from a standard steel plate.
Figure 13:
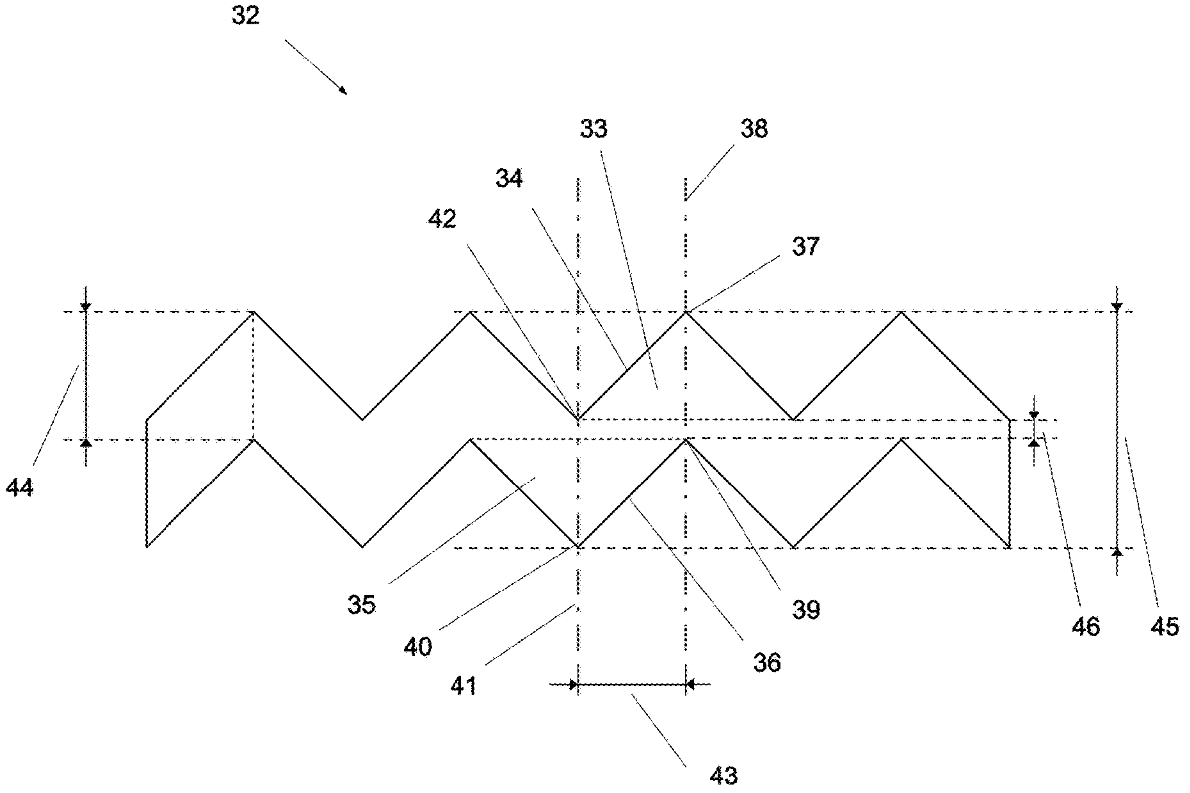
FIG. 13 shows the dimensions of the grooved plate in FIG. 12.

FIGS. 12-13 show the production of an offset aligned plate 32 with a relatively larger pitch and relatively larger teeth as compared to a conventional plate 2. In this example, the grooved plate 32 is formed from the same bulk material 62 (standard steel plate) as conventional plate 2, with a series of furrows formed therein to create an alternating sequence of teeth 33/35 and grooves 34/36. However, unlike the mirror aligned configuration in plate 2, the plate 32 is made by laterally offsetting the furrows, such that the resulting teeth 33 and grooves 34 on a first side of the plate 32 are laterally offset from the resulting teeth 35 and grooves 36 on a second side thereof. That is, the teeth 33/35 of a plate 32 are offset such that the peak 37 of a tooth 33 on a first side thereof resides on a common axis 38 with a valley 39 of a groove 36 on a second side thereof; and such that the peak 40 of a tooth 35 on a second side thereof resides on a common axis 41 with a valley 42 of a groove 34 on the first side thereof. With this arrangement, each tooth 33 on either side of the plate 32 is made to overlap, for a common width 43, with two separate teeth 35 on an opposite side thereof. As shown in FIG. 13, the plate 32 has a constant width 44 as measured at any location along its length (e.g., between an aligned pair of a peak 37 and a valley 39 on opposite sides of the plate 32); with a maximum profile width 45, as measured between peaks 37/40 of offset teeth 33/35 on opposite sides of the plate 32. As one non-limiting example, an offset grooved plate 32 may be made with a pitch of 5.50 mm (4.62 teeth/inch), a maximum width of 6.00 mm, and a root width of 0.50 mm, with the offset teeth 33/35 being offset by a common width of 2.75 mm and the plate 32 having a constant width 3.25 mm along substantially the entire length thereof (a base portion may have a thickened section with a width greater than 3.25 mm for support by spacing rods 48, as in FIG. 17).

Figure 14:
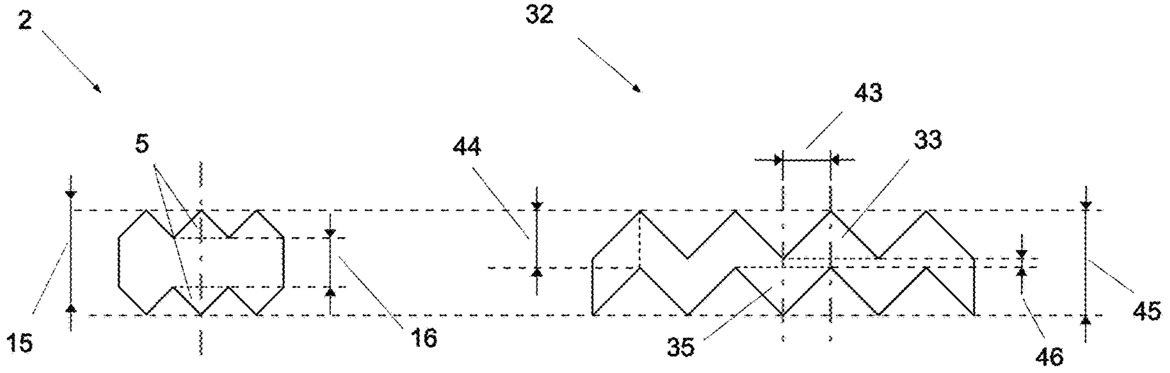
FIG. 14 shows a side-by-side dimensional comparison of the offset aligned grooved plate in FIG. 13 to the conventional grooved plate in FIG. 6.

A side-by-side comparison of the offset aligned grooved plate 32 to the conventional grooved plate 2 is provided in FIG. 14, where there can be better seen the relative dimensions of the several plates. As can be seen, the offset plate 32 can be made from the same stock material as the conventional plate 2, and with a maximum profile width 45 that matches the maximum width 15 of the conventional plate 2. As a result, manufacture of a grooved plate 32 is expected to incur a common material cost as that for a conventional plate 2, and a grooved plate 32 may be directly substituted for a conventional plate 2. In addition, though the root 46 of the plate 32 is quite small (as measured between offset valleys 39 and 42 on opposite sides of the plate 32), the constant width 44 throughout the plate 32 is expected to provide favorable structural integrity to reduce the potential for mechanical failures. Thus, the plate 32 provides the benefits of increased pitch and tooth size, enabling relatively stronger magnetic field intensities and higher magnetic gradients, while avoiding the increase to material costs and reductions in structural integrity that are expected from other grooved plates formed with similar pitch and tooth size.

Figure 15:
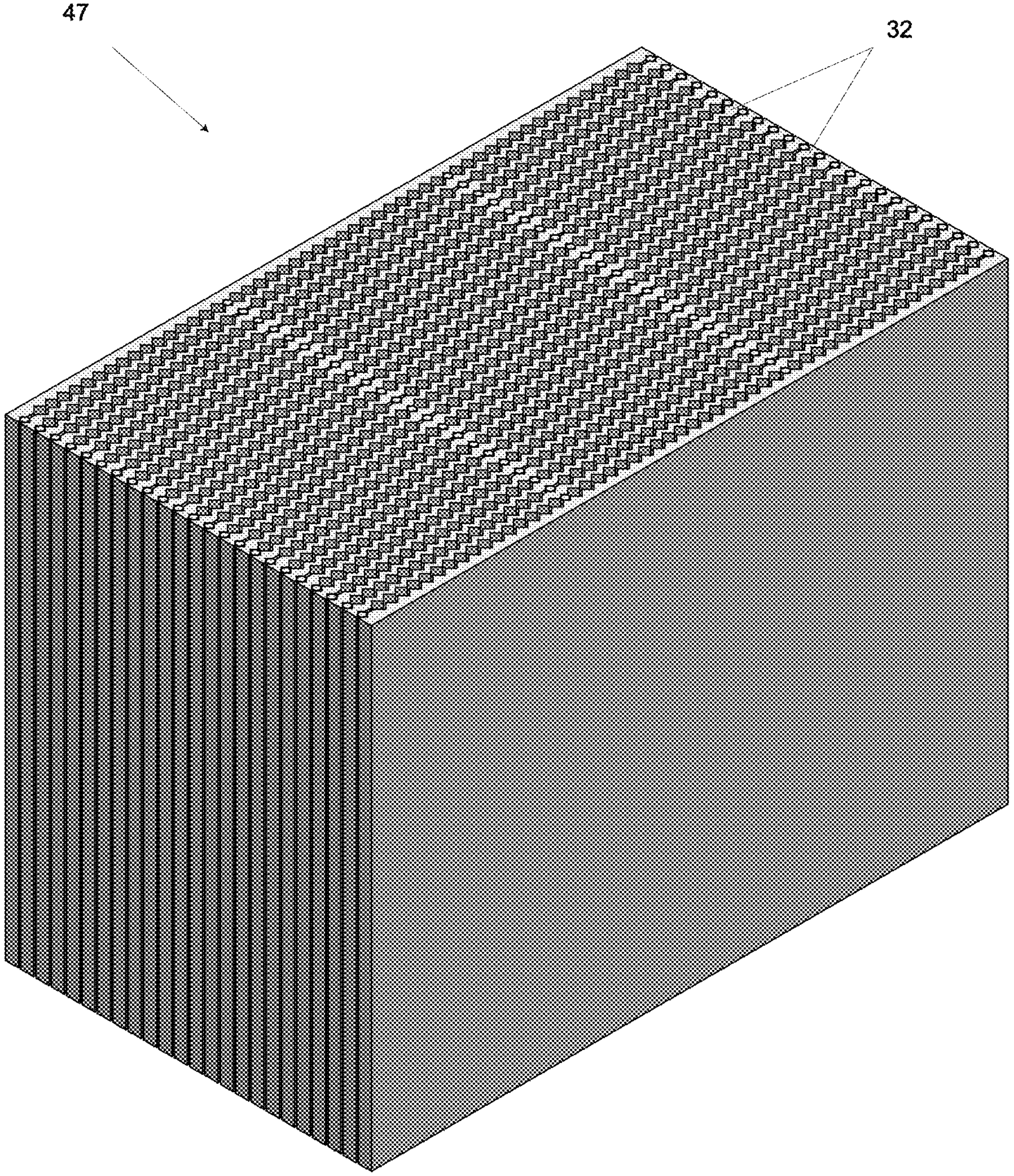
FIG. 15 shows a magnetic matrix formed from a plurality of the offset plate in FIG. 12.
Figure 16:
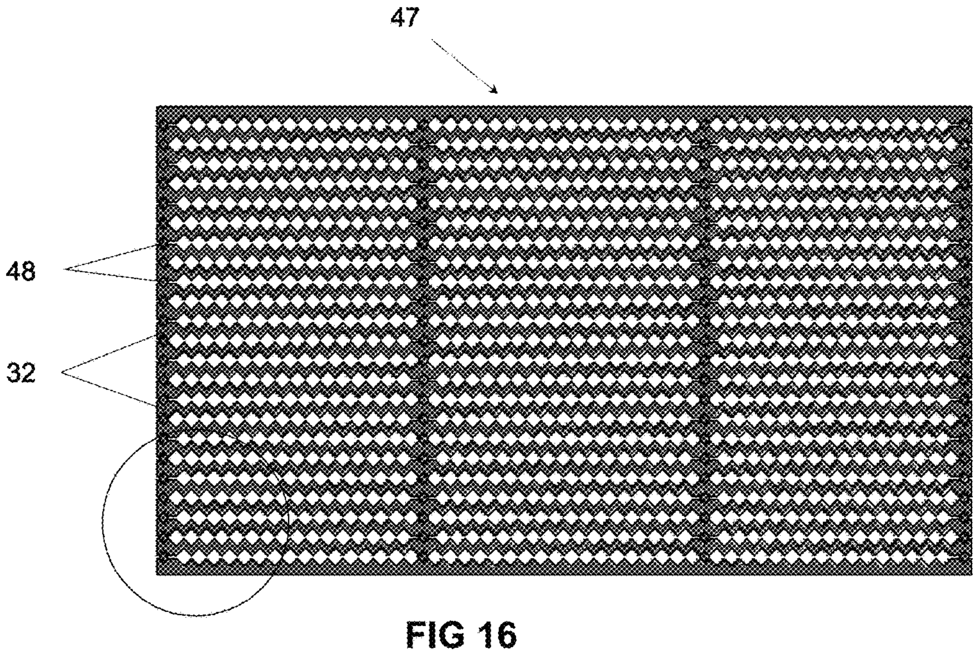
FIG. 16 shows a top plan view of the magnetic matrix of FIG. 15.
Figure 17:
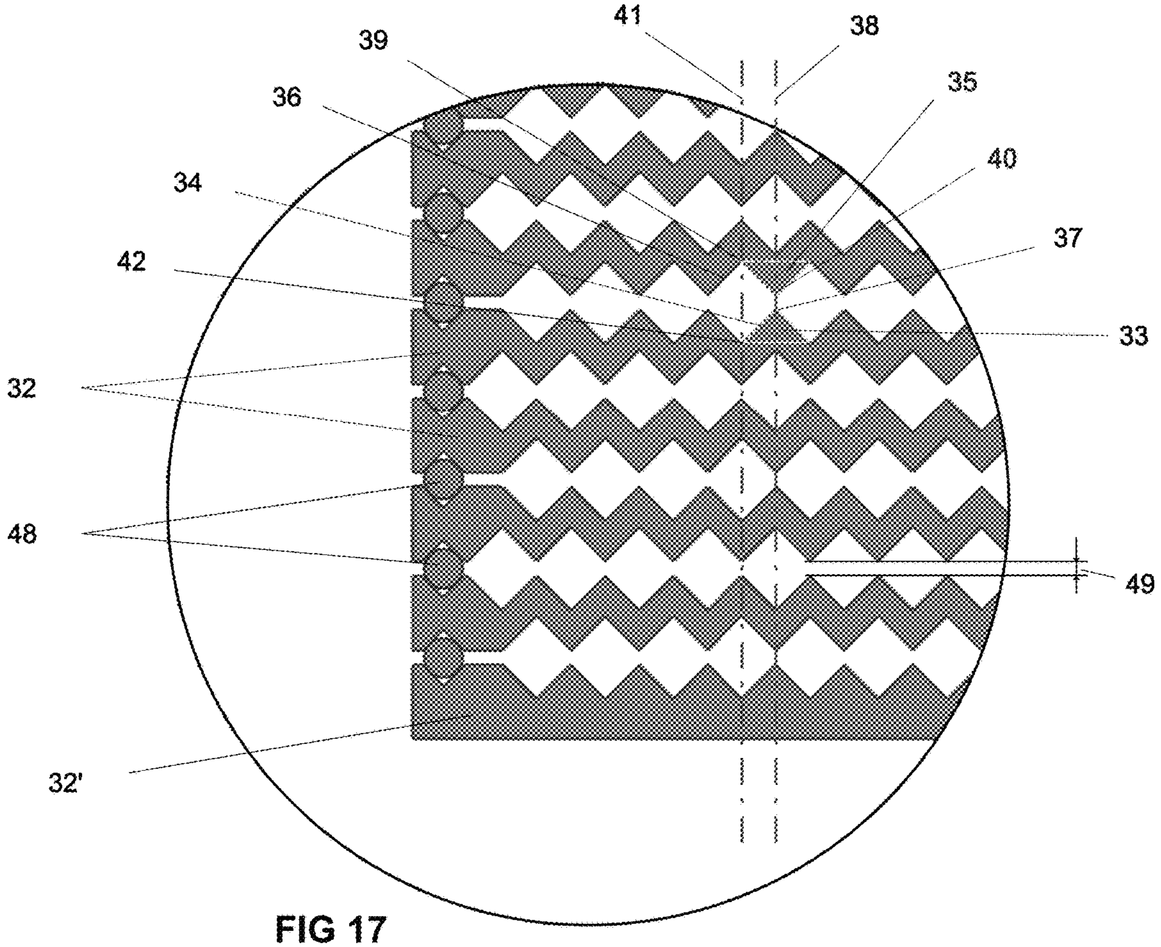
FIG. 17 shows a close-up of grooved plates in the magnetic matrix of FIG. 15.

FIGS. 15-17 show one example of a magnetic matrix 47 according to the present invention, formed from a plurality of grooved plates 32 aligned in parallel with one another, and separated from one another by spacing rods 48 to form gaps 49 therebetween. The plurality of plates 32 includes internal plates 32 that each have a number of teeth 33/35 and grooves 34/36 along both opposite first and second sides thereof, and external plates 32' that each have a number of teeth 33 and grooves 34 along only an inner side thereof.

As seen in FIGS. 16-17, the magnetic matrix 47 is made with grooved plates 32 that are configured and arranged such that individual teeth 33 are aligned throughout. That is, in this example, each plate 32 is aligned with the plates 32 adjacent thereto such that the peaks 37 of each tooth 33 on each plate 32 are made to align and reside on a common axis line 38 with the peaks 40 of opposing teeth 35 on an immediately adjacent plate 32. This alignment of the plates 32 likewise results in the valleys 39 of each groove 36 on each plate 32 aligning and residing on a common axis line 41 with the valleys 42 of opposing groves 34 on an immediately adjacent plate 32. However, as the plates 32 are made with an offset-alignment of teeth 33/35 and grooves 34/36, the magnetic matrix 47 does not have any axis line that contains only peaks or only valleys. Instead, the magnetic matrix 47 is characterized by a series of axis lines 38/41 that are each characterized by a repeating sequence of opposing "peak-peak" and opposing "valley-valley" alignments, with each laterally adjacent axis line 38/41 having a sequence that is longitudinally offset from the sequences of the axis lines laterally adjacent thereto.

Figure 18:
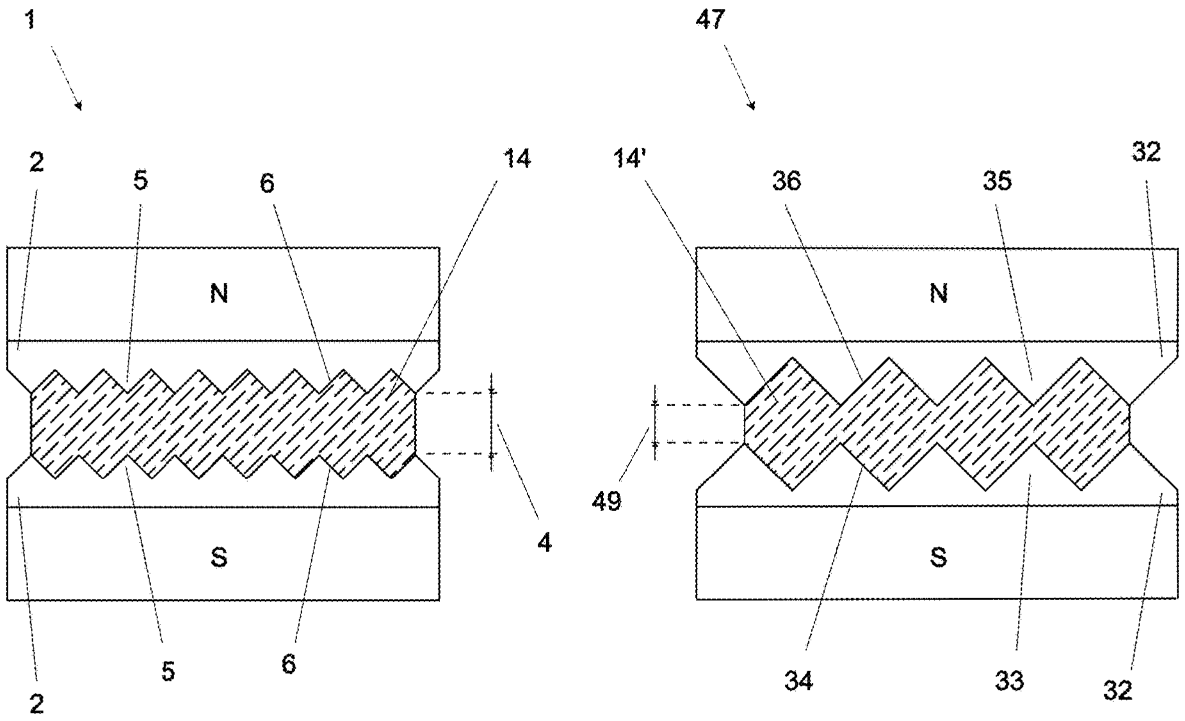
FIG. 18 shows comparative pass-through areas generated by two different magnetic grooved plates, including: (a) a grooved plate having a smaller pitch, with a larger number of smaller teeth and a larger gap, resulting in a smaller pass-through area; and (b) a grooved plate having a larger pitch, with a smaller number of larger teeth and a smaller gap, resulting in a larger pass-through area.

As shown in FIG. 18, grooved plates 32, with laterally offset teeth 33, can be aligned with one another to form a magnetic matrix 47 having a reduced gap 49 between adjacent plates 32, as compared to the minimum gap 4 required in a conventional magnetic matrix 1 formed from conventional grooved plates 2. As seen in FIG. 18, a conventional matrix 1, formed of conventional grooved plates 2 having smaller teeth 5 arranged in a mirrored alignment, is limited to a minimum gap 4 between adjacent teeth 5 in order to ensure a minimum groove clearance 14 between opposing groves 6 that avoids clogging by the particles of a material feed that is passed therethrough. However, a magnetic matrix 47 according to the present invention, formed of plates 32 having larger teeth 33/35 arranged in an offset alignment, allows for a gap 49 of relatively lesser width due to the increased groove clearance 14' provided by the larger grooves 34/36 formed in the plates 32.

When constructing a magnetic matrix according to the present invention, it is preferable that the magnetic matrix be made with a ratio of plate pitch to gap that is a range of 3:1 to 20:1. For example, if a magnetic matrix 47 is made with grooved plates 32 having a pitch of 6.35 mm, then it is preferable that the gaps 49 between the adjacent plates 32 measure between 2.116 mm and 0.3175 mm. Thus, magnetic matrices according to the present invention are inclusive of constructions that have a reduced gap spacing in a range of between 1.5 mm and 0.3175 mm, which is not practical in conventional magnetic matrices.

Figure 19:
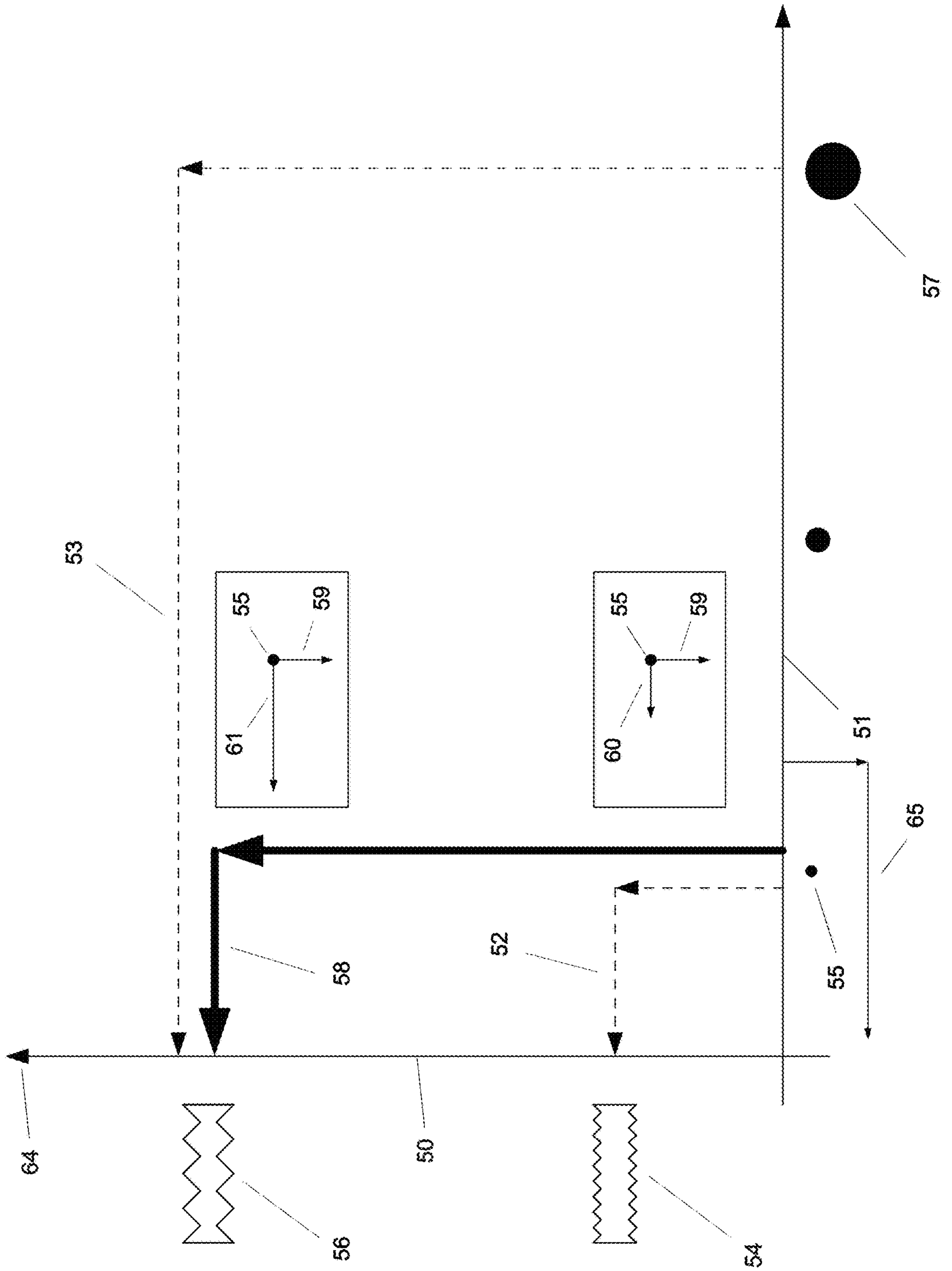
FIG. 19 shows comparative plots illustrating the positive correlation of grooved plate pitch to particle size as currently adopted in the industry, and the inverse correlation according to the present invention.

FIG. 19 shows a graphical representation of the presently perceived wisdom in the art, as taught by KHD, relative to improvements made by the present invention. In this chart, the horizontal axis 51 represents particle size (μm) and the vertical axis 50 represents magnetic field intensity. Arrow 64 indicates an increasing magnetic intensity, and arrow 65 identifying particles having an average diameter of about 50 μm or less, which are predominantly influenced by high hydrodynamic drag forces, as compared to larger particles that are predominantly influenced by gravitational forces.

The teachings of KHD are represented by correlations 52/53, indicating that a grooved plate having a smaller pitch and smaller teeth 54 should be used to separate smaller, ultrafine particles 55 (positive correlation 52); and that a grooved plate having a larger pitch and larger teeth 56 should be used to separate larger, course particles 57 (positive correlation 53). Meanwhile, contrary to the teachings of KHD, the present invention recognizes that superior results in the separation of smaller, ultrafine particles 55, having an average diameter of about 50 μm or less, are achieved with use of a grooved plate having a larger pitch and larger teeth 56 (negative correlation 58).

The negative correlation 58 of the present invention is based on the competing force vectors encountered by an ultrafine particle 55 that passes through a magnetic matrix, with a vector plot 60/59 showing the force vectors on a particle passing by a grooved plate with smaller teeth 54, and a vector plot 61/59 showing the force vectors on a particle passing by a grooved plate with larger teeth 56. As shown by the vector plots, the hydrodynamic drag force vector 59 acting on an ultrafine particle that travels in a material feed flow is the same regardless of the magnetic plate it passes, though the magnetic force vector 61 from the plate with larger teeth 56 is stronger than the magnetic force vector 60 from the plate with smaller teeth 54. As discussed previously, the difference in the magnetic force vectors 60/61 is due to a relative separation of magnetic field lines in the plate with smaller teeth 54 as compared to a relative concentration of magnetic field lines in the plate with larger teeth 56, with the respective differences in the magnetic field line concentration effecting corresponding differences in magnetic field intensity and thus magnetic force vectors 60/61.

In use, a magnetic matrix according to the present invention may be made from any one of the grooved plates 17, 24 and 32; and a material feed containing magnetic and non-magnetic components is then passed through the magnetic matrix for the separation of such components. The material feed may be either a dry material feed or a wet material feed. In a preferred embodiment, the material feed that is passed through a magnetic matrix according to the present invention is one containing ultrafine magnetic particles; and specifically ultrafine magnetic particles having an average diameter of about 50 μm or less.

Optionally, a magnetic matrix according to the present invention may be used in the manufacture and/or assembly of a magnetic separator, and may also be used to retrofit a pre-existing magnetic separator by being substituted as a replacement for a conventional magnetic matrix in the pre-existing magnetic separator.

Although the present invention is described with reference to particular embodiments, it will be understood to those skilled in the art that the foregoing disclosure addresses exemplary embodiments only; that the scope of the invention is not limited to the disclosed embodiments; and that the scope of the invention may encompass additional embodiments embracing various changes and modifications relative to the examples disclosed herein without departing from the scope of the invention as defined in the appended claims and equivalents thereto.

To the extent necessary to understand or complete the disclosure of the present invention, all publications, patents, and patent applications mentioned herein are expressly incorporated by reference herein to the same extent as though each were individually so incorporated. No license, express or implied, is granted to any patent incorporated herein.

The present invention is not limited to the exemplary embodiments illustrated herein, but is instead characterized by the appended claims, which in no way limit the scope of the disclosure.

What is claimed is:

1. A method of magnetically separating particles, comprising:

passing a material feed through a magnetic matrix; wherein the magnetic matrix comprises a plurality of plates, comprising inner plates and outer plates, with at least the inner plates being formed as grooved plates having first and second sides that both have an alternating series of teeth and grooves therealong, the inner plates having a pitch of approximately 6.35 mm, with adjacent inner plates separated from one another by a gap, the gap having a width in a predetermined range such that the magnetic matrix has a pitch-to-gap ratio in a range of 3:1 to 20:1, and the material feed comprises magnetic and non-magnetic ultrafine particles.

2. The method according to claim 1, wherein the ultrafine particles comprise particles having an average diameter of about 50 μm or less.

3. The method according to claim 1, wherein the material feed is a dry material feed.

4. The method according to claim 1, wherein the material feed is a wet material feed.

5. The method according to claim 1, wherein each inner plate has an offset alignment in which teeth and grooves on a first side of a plate are laterally offset from teeth and grooves on a second side of the same plate.

6. The method according to claim 5, wherein the offset alignment is one such that peaks of the teeth on the first side of the plate reside on a common axis as valleys of the grooves on the second side of the plate, and such that peaks of the teeth on the second side of the plate reside on a common axis as valleys of the grooves on the first side of the plate.

7. The method according to claim 1, wherein adjacent inner plates of the magnetic matrix are separated from one another by a gap, the gap having a width in a range from about 0.3175 mm to about 2.116 mm.

8. The method according to claim 7, wherein the gap has a width in a range from about 0.3175 mm to about 1.5 mm.

9. A method of magnetically separating particles, comprising:

passing a material feed through a magnetic matrix; wherein the magnetic matrix comprises a plurality of plates, comprising inner plates and outer plates, with at least the inner plates being formed as grooved plates having first and second sides that both have an alternating series of teeth and grooves therealong, the inner plates having a pitch of approximately 3.175 mm or greater, with adjacent inner plates of the magnetic matrix separated from one another by a gap, the gap having a width in a range from about 0.3175 mm to about 2.116 mm, and the material feed comprises magnetic and non-magnetic ultrafine particles.

10. The method according to claim 9, wherein the material feed is a dry material feed.

11. The method according to claim 9, wherein the material feed is a wet material feed.

12. The method according to claim 9, wherein each inner plate has an offset alignment in which teeth and grooves on a first side of a plate are laterally offset from teeth and grooves on a second side of the same plate.

13. The method according to claim 12, wherein the offset alignment is one such that peaks of the teeth on the first side of the plate reside on a common axis as valleys of the grooves on the second side of the plate, and such that peaks of the teeth on the second side of the plate reside on a common axis as valleys of the grooves on the first side of the plate.

14. The method according to claim 9, wherein the gap has a width in a range from about 0.3175 mm to about 1.5 mm.

15. The method according to claim 14, wherein the ultrafine particles comprise particles having an average diameter of about 50 μm or less.

16. The method according to claim 15, wherein the gap has a width in a predetermined range such that the magnetic matrix has a pitch-to-gap ratio in a range of 3:1 to 20:1.

17. The method according to claim 9, wherein the ultrafine particles comprise particles having an average diameter of about 50 μm or less.

18. The method according to claim 17, wherein the gap has a width in a predetermined range such that the magnetic matrix has a pitch-to-gap ratio in a range of 3:1 to 20:1.

19. The method according to claim 9, wherein the gap has a width in a predetermined range such that the magnetic matrix has a pitch-to-gap ratio in a range of 3:1 to 20:1.

20. A method of magnetically separating particles, comprising:

passing a material feed through a magnetic matrix; wherein the magnetic matrix comprises a plurality of plates, comprising inner plates and outer plates, with at least the inner plates being formed as grooved plates having first and second sides that both have an alternating series of teeth and grooves therealong, with adjacent inner plates of the magnetic matrix separated from one another by a gap, the gap having a width in a range from about 0.3175 mm to about 2.116 mm, and the inner plates having a pitch such that the magnetic matrix has a pitch-to-gap ratio in a range of 3:1 to 20:1, and the material feed comprises magnetic and non-magnetic ultrafine particles.

21. The method according to claim 20, wherein the material feed is a dry material feed.

22. The method according to claim 20, wherein the material feed is a wet material feed.

23. The method according to claim 20, wherein each inner plate has an offset alignment in which teeth and grooves on a first side of a plate are laterally offset from teeth and grooves on a second side of the same plate.

24. The method according to claim 23, wherein the offset alignment is one such that peaks of the teeth on the first side of the plate reside on a common axis as valleys of the grooves on the second side of the plate, and such that peaks of the teeth on the second side of the plate reside on a common axis as valleys of the grooves on the first side of the plate.

25. The method according to claim 20, wherein the gap has a width in a range from about 0.3175 mm to about 1.5 mm.

26. The method according to claim 25, wherein the ultrafine particles comprise particles having an average diameter of about 50 μm or less.

27. The method according to claim 20, wherein the ultrafine particles comprise particles having an average diameter of about 50 μm or less.

* * * * *